(12) United States Patent
Tang et al.

(10) Patent No.: US 9,361,720 B2
(45) Date of Patent: Jun. 7, 2016

(54) IMAGE PRIORITIZATION IN A COLLAGE SHAPE

(75) Inventors: Hao Tang, Mountain View, CA (US); Daniel R. Tretter, San Jose, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/347,374

(22) PCT Filed: Feb. 29, 2012

(86) PCT No.: PCT/US2012/027120
§ 371 (c)(1),
(2), (4) Date: Mar. 26, 2014

(87) PCT Pub. No.: WO2013/130071
PCT Pub. Date: Sep. 6, 2013

(65) Prior Publication Data
US 2015/0213635 A1  Jul. 30, 2015

(51) Int. Cl.
*G06K 9/34* (2006.01)
*G06T 11/60* (2006.01)
*G06T 7/00* (2006.01)

(52) U.S. Cl.
CPC .............. *G06T 11/60* (2013.01); *G06T 7/0081* (2013.01); *G06T 7/0097* (2013.01); *G06T 2207/20144* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 7,529,429 B2 | 5/2009 | Rother et al. | |
| 7,532,771 B2 | 5/2009 | Taylor | |
| 7,573,486 B2 | 8/2009 | Mondry et al. | |
| 7,576,755 B2 | 8/2009 | Sun et al. | |
| 7,653,261 B2 * | 1/2010 | Blake | G06K 9/469 358/452 |
| 7,848,596 B2 * | 12/2010 | Widdowson | G06T 11/60 358/1.2 |
| 2006/0104542 A1 * | 5/2006 | Blake | G06K 9/469 382/284 |
| 2006/0220983 A1 * | 10/2006 | Isomura | G06F 17/3028 345/1.1 |
| 2007/0058884 A1 * | 3/2007 | Rother | G06T 11/60 382/284 |
| 2007/0253028 A1 * | 11/2007 | Widdowson | G06T 11/60 358/1.18 |
| 2008/0123993 A1 * | 5/2008 | Widdowson | G06T 11/60 382/284 |
| 2010/0164986 A1 | 7/2010 | Wei et al. | |
| 2010/0322521 A1 | 12/2010 | Tal et al. | |
| 2011/0096075 A1 | 4/2011 | Borders et al. | |
| 2011/0200273 A1 * | 8/2011 | Singhal | G06K 9/3233 382/284 |
| 2012/0110491 A1 * | 5/2012 | Cheung | G06T 11/60 715/771 |
| 2012/0275704 A1 * | 11/2012 | Cok | H04N 1/00196 382/190 |

FOREIGN PATENT DOCUMENTS

WO  WO-2010124376  11/2010

OTHER PUBLICATIONS

"Country Collages".
"Shape Collage Features".
Wang, J, et al, "Picture Collage", Jun. 17-22, 2006.
Wei, Y et al, "Efficient Optimization of Photo Collage".

* cited by examiner

*Primary Examiner* — Feng Niu
(74) *Attorney, Agent, or Firm* — HP Inc. Patent Department

(57) ABSTRACT

Embodiments disclosed herein relate to image prioritization in a collage shape. In one embodiment, image positions are determined within a collage shape based on an importance level map of the collage shape and priorities of the images to be positioned within the collage shape. A collage may be created with the collage images in the determined positions.

15 Claims, 4 Drawing Sheets

IMAGE PRIORITIZATION IN A COLLAGE SHAPE

BACKGROUND

Compilations and designs may be created from a set of images. For example, a collage may be automatically created from a set of images selected from a user. The collage may allow more images to be viewable in a smaller space. A user may create a collage to be placed, in a book of photographs, a greeting card, or a poster.

BRIEF DESCRIPTION OF THE DRAWINGS

The drawings describe example embodiments. The following detailed description references the drawings, wherein.

DETAILED DESCRIPTION

A collage may be created from a group of images to combine them in an overlapping aesthetically pleasing manner. A collage may created in a manner that automatically prioritizes collage images and positions within the collage shape to increase the likelihood that more important images and more interesting portions of images appear more prominently to a viewer. For example, a collage may be created to appear in the shape of a collage template, such as a circular, rectangular, or diamond shaped collage template, and an importance level map may be associated with the collage template that indicates areas of the collage template shape likely to appear more prominent to a viewer. Images may be assigned a priority by a user, or a processor may automatically determine a priority for an image or an area of an image. The images may be placed within the collage shape in a manner that places images with higher priorities in more prominent areas of the collage shape.

Figure 1:
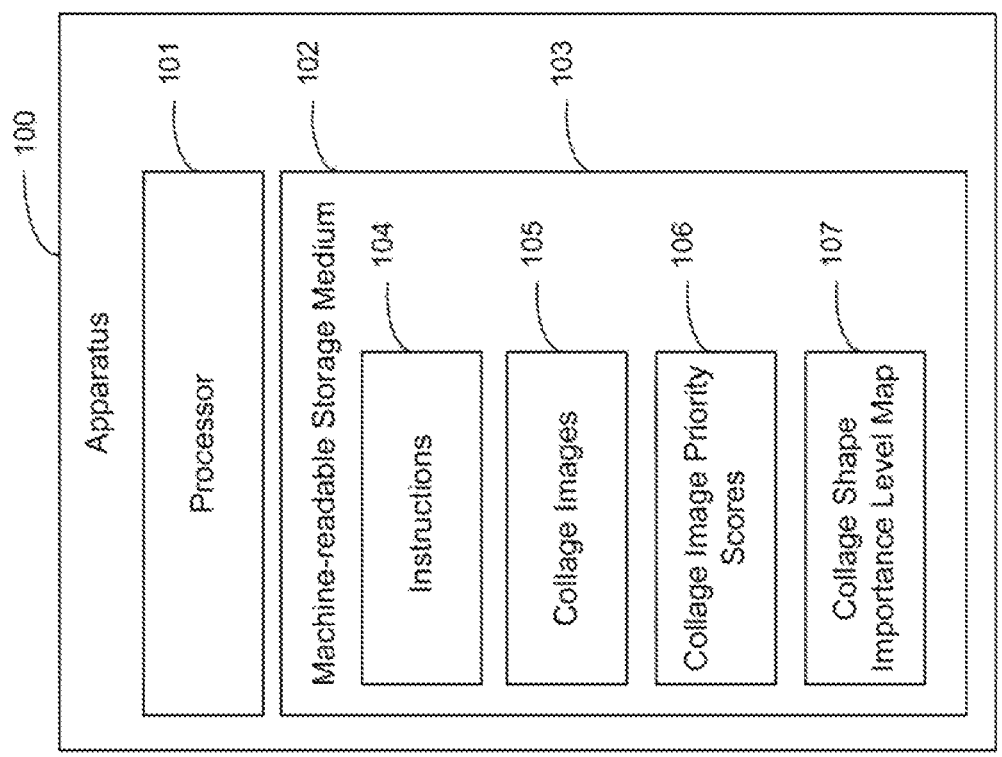
FIG. 1 is a block diagram illustrating one example of an apparatus

FIG. 1 is a block diagram illustrating one example of an apparatus 100. The apparatus 100 may create a collage of images in a shape template such that the images are arranged within the shape based on a priority associated with the images. For example, the apparatus 100 may determine an importance level map of the shape template indicating areas of the shape likely to appear more prominent, and the apparatus may place higher priority images or regions of images in areas of the shape determined to be likely to appear more prominent.

The apparatus 100 may include a processor 101 and a machine-readable storage medium 102. The processor 101 may be any suitable processor, such as a central processing unit (CPU), a semiconductor-based microprocessor, or any other device suitable for retrieval and execution of instructions. In one embodiment, the apparatus 100 includes logic instead of or in addition to the processor 101. As an alternative or in addition to fetching, decoding, and executing instructions, the processor 101 may include one or more integrated circuits (ICs) or other electronic circuits that comprise a plurality of electronic components for performing the functionality described below. In one implementation, the apparatus 100 includes multiple processors. For example, one processor may perform some functionality and another processor may perform other functionality.

The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may store collage images 105, collage image priority scores 106, and collage shape importance level map 107. The machine-readable storage medium 102 may include instructions 104 executable by the processor 101 to create a collage from the collage images 105. The instructions 104, collage images 105, college image priority scores 106, and collage shape importance level map 107 may be stored in the, same storage or in separate storages, such as storages accessible to the processor 101 via a network.

The collage images 105 may be any suitable images for creating a collage, such as photographs or artistic images. A collage may be created from the collage images 105 or a portion of the collage images 105. In some cases, a user may upload the collage images 105 or mark already uploaded images 105 that the user selects for the collage.

The collage image priority scores 106 may include scores indicating a relative priority between the images. The collage image priority scores 106 may be provided by a user. For example, a user may select collage images and indicate which of the selected images have a higher priority to be more visible in the collage. In some cases, the image priority scores may be automatically determined. For example, the processor 101 or a separate processor may analyze the collage images 105 to determine regions of interest within the collage images 105 and prioritize the regions of interest relative to one another. An image may have multiple regions of interest were the regions of interest have different priority levels. For example, an image may include a person and a background, and the face may have a first priority level, the body may have a second priority level, and the background may have a third priority level. In some cases, the collage image priority scores 106 include a priority determined based on both user input about the priority of an image as a whole and automatically determined priority information about regions of interests within the images.

The collage shape importance level map 107 may include information indicating levels of priority within a collage shape. For example, a collage template may be in the shape of a circle, and the center of the circle may have a higher priority level than the outer portions of the circle. The collage shape importance level map 107 may be stored as coordinates of the collage shape associated with priority levels. The collage shape. importance level map 107 may be stored, for example, as a table of location coordinates where the coordinates are associated with priority levels. The processor 101 may create the collage shape importance level map 107, or it may be created by a separate processor. In some cases, a user may indicate important areas of a collage shape template.

The instructions 104 may include instructions executable by the processor 101 to create a collage of the collage images 105 within a collage shape using the collage image priority scores 106 and the collage shape importance level map 107. For example, the instructions 104 may include instructions for determining the location, scale, and orientation of the collage images within the collage. The scale of the collage images may be determined based on the priority of the images. For example, a higher priority image may have a larger scale so that the items in the image appear larger. The size of a higher priority image may also he larger. The orientation may be adjusted so that higher priority images are more vertical. The location of the images may be based on the collage shape importance level map 107 such that higher priority images and images with higher priority regions of interest appear at more important areas of the collage shape. The collage images 105 may be positioned such that higher priority images and regions of interest are more visible and not as hidden by overlapping adjacent images.

The instructions 104 may include instructions for creating the collage in any suitable manner. The instructions 104 may include instructions for creating candidate collages and comparing parameters of the candidate collages to select one of the candidates for the actual collage. For example, the amount of the collage shape covered by the images and the priority and placement of the visible portions of the images may be compared between the candidate collages.

Figure 2:
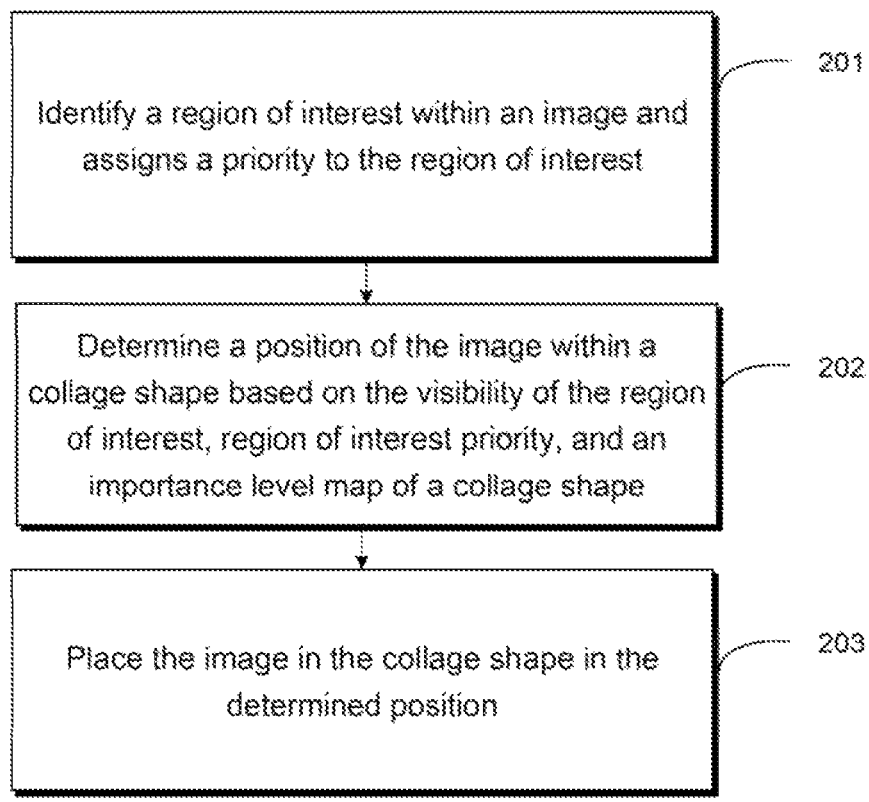
FIG. 2 is a flow chart illustrating one example of placing an image within a collage shape based on an importance level map of the collage shape.

FIG. 2 is a flow chart 200 illustrating one example of placing an image within a collage shape based on an importance level map of the collage shape. An image may be placed in the collage based on the priority of a region of interest in the image and an importance level map of the shape template of the collage. For example, images may be arranged on the collage shape such that higher priority images or images with regions of higher priority are positioned in more important areas of the collage shape, such as areas of the collage shape likely to appear more prominent. The method may be implemented, for example, by the processor 101 of FIG. 1.

Beginning at 201, a processor identifies a region of interest within an image and assigns a priority to the region of interest. A region of interest may be a region of the image that is determined to be of greater interest than other regions of the image. The regions of interests may be used to determine which portions of images to be visible in a collage such that they are not covered by overlapping adjacent images. The region of interest may be based on the content of the image. For example, a face in a photograph may be found to be a region of interest, and a background portion may not be found to be a region of interest.

A relative priority may be assigned to the region of interest. For example, a saliency map of the image may be analyzed by a processor to identify regions of interest and assign priorities to them. The saliency map may show the differences between pixels in the image such that areas of greater contrast or particular types of contrast may be given a greater priority. In some implementations, a user may provide information to be used to calculate the priority level of images and regions of interest, such as by selecting a person to indicate that images of that person should be of higher priority. The priority may in some cases be based on a priority of the image as a whole. For example, a user may provide a priority level for the image, such as marking the image as the one the user prefers, or a priority may be assigned to an image based on its content. For example, images of a particular subject may be assigned a higher priority. In some implementations, a region of interest in the image may be assigned the priority of the image as a whole, or the priority of the image may he factored into the priority of the region of interest.

In one implementation, an image may have multiple regions of interest. For example, an image may have two people where the face of each of the people is identified as a region of interest. The priority of the regions of interest in an image may differ. For example, the eyes of a person may have a first priority level, the torso may have a second priority level, and the background have a third priority level.

Proceeding to 202, a processor determines a position of the image within a collage shape based on the visibility of the region of interest, region of interest priority, and an importance level map of the collage shape. For example, the processor may determine a collage position for the image such that image is placed within the collage shape based on the priority of the image. Positioning the image may involve determining the size, scale, orientation, depth, and location of the image in the collage. The collage shape may be automatically selected or selected by a user. In some cases, a user may provide a custom collage shape for the collage.

The location of the image may be determined based on an importance level map of the collage shape. The processor may determine are importance level map for the collage shape, may receive it from user input, or may retrieve it from a storage. For example, a processor may analyze a collage shape template to determine priority levels for different areas of the shape. In some implementations, the priority levels may be determined based on the distance from the edge. For example, the center of the shape may be assigned a higher priority than areas close to the edge of the shape. The priority may be based on the context of the shape. For example, in a shape of a person, a face may be higher priority than the body. A user may indicate areas of the shape of greater priority. For example, a collage shape may be in the shape of a basketball player dribbling a basketball, and a user may indicate that the high priority areas are the basketball and the player's face.

Figure 3:
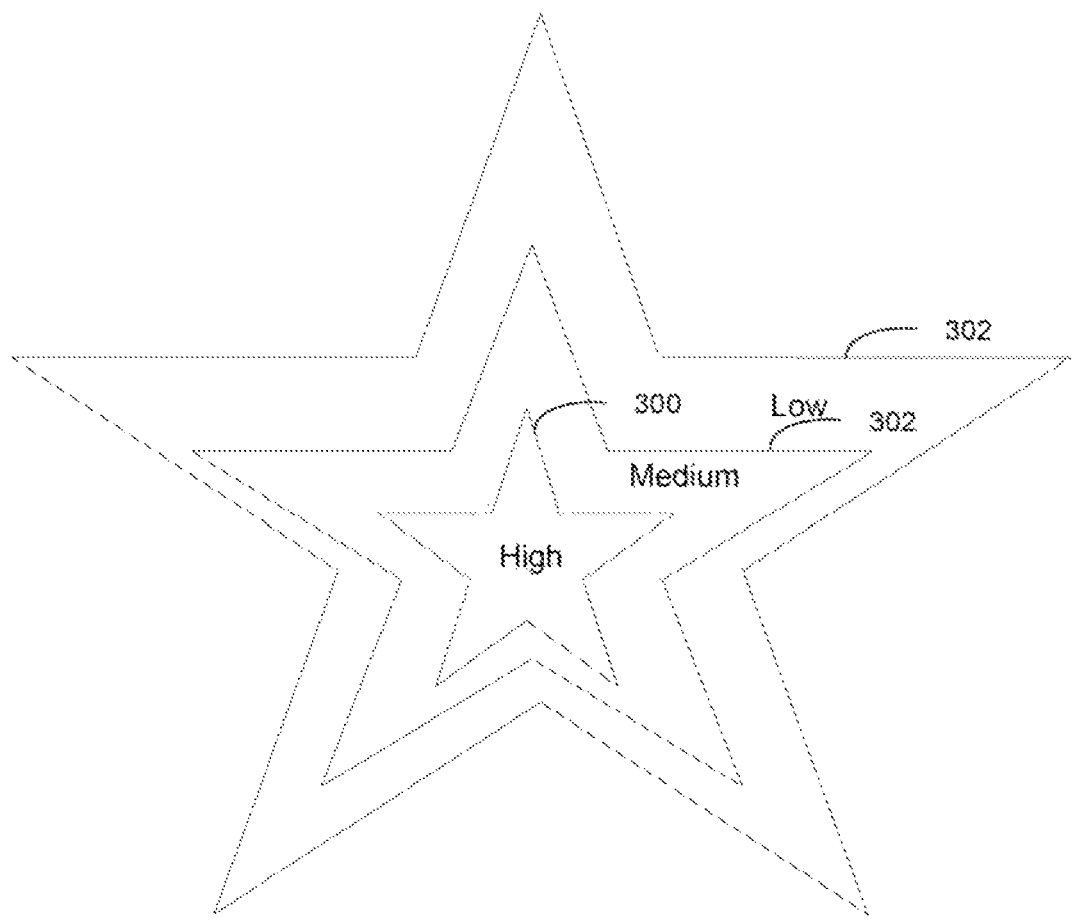
FIG. 3 is a diagram illustrating one example of a collage shape importance level map.

FIG. 3 is a diagram illustrating one example of a collage shape importance level map. The star college shape has high priority region 300, medium priority region 301, and low priority region 302. The priority regions are based on the distance from the edge of the collage shape such that areas farther from the edge of the collage shape have a higher priority.

The region of interest within the image may be considered in determining a position for the image. For example, the image may he placed in the collage such that the region of interest is visible, but other portions of the image may be covered by other images. A region of interest may not be visible because it appears to be covered by another image, such as because it is cropped to be a particular shape within the collage to allow for room for other images. The position of the image may be based on the priority of the region of interest. For example, the image may be placed in the collage such that a first region of interest in the image with a lower priority is not visible but a second region of interest with a higher priority is visible. An image or region of interest of higher priority may be positioned such that it is at a lower depth within the collage than an image or region of interest of lower priority.

The location of the image within the collage shape may be determined based on the priority of the region of interest. For example, a region of interest with a greater priority may be placed within the location in an area of the collage shape determined to be more prominent based on the importance level map associated with the collage shape. An image may have multiple regions of interest with different priorities, and the image may be placed within the collage shape such that the portion of the image with a higher priority is positioned in a more important area of the collage shape and the portion of the image with a lower priority is positioned in a less important area of the collage shape.

The orientation of the image may be determined based on the priority of the region of interest. For example, the image may be positioned to be more vertical or to be positioned at an angle in the collage according to the priority. A higher priority region of interest may be oriented so that it appears more prominent or recognizable.

Positioning the image may include determining the amount of space to be used by the image. For example, the scale of the image may determine how large the image may be and how much space it will take on the collage shape. In one implementation, the scale of the image is based on the priority of the image. For example, a user may indicate that a particular image has a higher priority, and it may be sized to be larger than images of lower priorities. In one implementation, the size of the image is based on the priorities of the regions of interest in the image. For example, an image, including regions of interest with higher priorities may be larger than an image with regions of interest with lower priorities. In some cases, the scale of the image may be determined by the priority, and the size of the image is unchanged based on the priority, such that fewer areas of the image are visible.

The position of the image may be based on the position of other images in the collage. For example, the position may be based on the depth of the image if placed at a particular location within the collage. The location may be determined based on the other images that would overlap the image being placed or the images that the image being placed would overlap. The position may be based on the remaining amount of blank space in the collage and the location of the unused space.

Moving to 203 of FIG. 2, a processor places the image in the collage shape in the determined position. For example, the image may be placed according to the determined location, orientation, scale, size, and depth.

In one implementation, the processor continues the process and places a second image in the collage shape starting with step 201. The processor may place the images in the collage shape in any suitable order. In some cases, the processor may place the images in the collage based on a priority associated with the images. For example, an image with a higher priority or a region of interest with a higher priority may be placed in the collage before an image of lower priority. In one implementation, the images are sized based on priority, and the images are then placed in the collage shape in order of size.

In one implementation, multiple candidate collages are created. For example, collage images may be placed in multiple collages such that the images may be placed differently in the different candidate collages, and the candidate collages may be compared to select one of the candidate collages for the final collage. A score may be provided to the candidate collage, and the scores may be compared to determine which candidate collage to select.

Figure 4A:
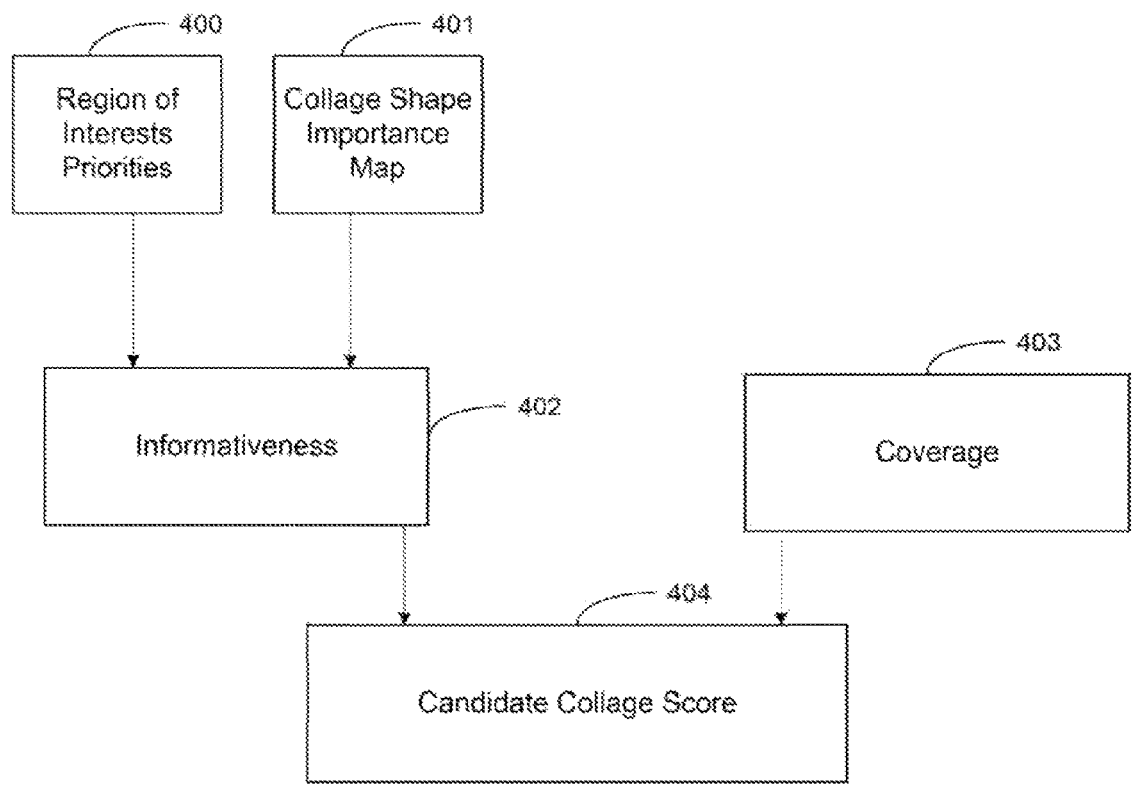
FIG. 4A is a diagram illustrating one example of determining a candidate collage score

FIG. 4A is a diagram illustrating one example of determining a candidate collage score. The candidate collage score 404 may involve an informativeness parameter 402 and a coverage parameter 403 of the candidate collage. Images may be placed in the candidate collages in a manner that balances the collage informativeness and coverage of the candidate collage. Informativeness may involve having regions of interest, particularly high priority regions of interest, visible in the collage such that they are not covered by other images, and coverage may involve covering more of the collage shape such that less of it is covered with a background or other filler.

The informativeness parameter 402 may be based on the regions of interests priorities 400 and the collage shape importance map 401. The informativeness parameter 402 may involve a computation of the regions of interest that are visible, such as where regions of interest are not hidden by overlapping images. For example, a collage with more regions of interest visible may receive a higher score than a candidate collage with fewer regions of interest visible. The priority of the regions of interest may be taken into account. For example, a candidate collage with higher priority regions of interest visible may receive a higher score than a candidate collage with fewer of the higher priority regions of interest visible to a viewer. The score may be based on a weighted value of regions of interest that are visible where the weight is based on the priority. The informativeness parameter 402 may be based on the position of the images within the college shape. For example, a candidate collage that includes more important regions of interest or more important images in areas of the collage shape that are given a higher priority on the collage shape importance map may receive a higher score. The informativeness parameter 402 may take into account image orientation, scale, size, location, and depth in relation to the priority of the image and regions of interest within the image The coverage parameter 403 may be based on the amount of the collage shape covered by images. For example, one collage candidate may include additional space for filler than another candidate collage. The candidate collage that fills more of the collage shape space with images may receive a higher coverage score.

Figure 4B:
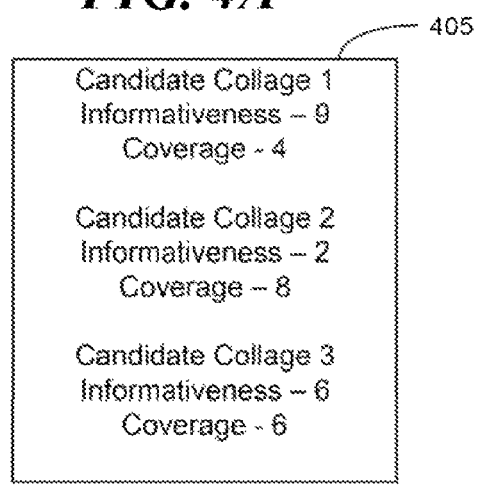
FIG. 4B is a diagram illustrating candidate collage informativeness and coverage scores.

FIG. 4B is a diagram illustrating candidate collage informativeness and coverage scores. Block 405 shows values for the informativeness and coverage parameters for three candidate collages. Candidate collage 1 has a higher informativeness parameter and a lower coverage parameter, candidate collage 2 has a higher coverage parameter and a lower informativeness parameter, and candidate collage 3 has a coverage parameter and informativeness parameter both at 6. A candidate collage may be selected in any suitable manner. In some cases, the candidate collage with the maximum total coverage and informativeness may be selected. In sonic cases, a candidate collage with greatest balance between the coverage and informativeness may be selected. For example, candidate collage 3 may be selected because neither the coverage or informativness is sacrificed to the degree as in candidate collages 1 and 2. In some cases, the informativeness or coverage parameter score may be given a greater weight than the other when selecting a candidate collage.

The collage may be finalized after the collage images are placed within the collage shape. For example, the collage images falling outside of the collage shape may be altered. In one implementation, the collage is cropped to form the collage shape. For example, images on the edge of the collage shape may be cropped. In some cases, an image may not reach to the edge of the collage shape in some areas, and a border or other background may be added to that area to provide filler for the portions of the collage shape not covered by collage images. In one implementation, pixels are added to create a blended transition between images where there is space between images in the collage. In some implementations, blended transitions are added between images where adjacent images touch one another.

The finalized collage may be output. For example, it may be display, stored, or transmitted. In some implementations, the finalized collage may be printed for a user or transmitted to a users electronic device. The finalized collage may be part of another design, such as where the collage is a portion of a greeting card or other product.

The invention claimed is:
1. A method, comprising:
  creating a candidate collage score by:
    identifying, by a processor, a region of interest within an image and assigning a priority to the region of interest;

determining, by a processor, a position of the image within a collage shape based on a visibility of the region of interest, the priority of the region of interest, and an importance level map of the collage shape to create a determined position;

placing, by a processor, the image in the collage shape in the determined position; and determining, by a processor, an informativeness parameter and a coverage parameter wherein the informativeness parameter is based on at least one priority associated with the visibility of the region of interest, and a position of the visibility of the region of interest within the importance level map, and wherein the coverage parameter is based on an amount of the collage shape covered by the image.

2. The method of claim 1, further comprising determining, by a processor, the importance level map based on the distance of areas of the collage shape from the edge of the collage shape.

3. The method of claim 1, wherein two regions of interest are determined within the image and a different priority is associated with each of the two regions.

4. The method of claim 1, further comprising determining, by a processor, a size of the image based on a priority of the image.

5. The method of claim 1, further comprising adding pixels adjacent to the image in an area between the image and an adjacent image.

6. The method of claim 1, wherein determining the position of the image comprises determining, by a processor, at least one of a size, a location, a depth, or an orientation of the image.

7. An apparatus, comprising:

a non-transitory machine-readable storage medium storing collage images, priority scores associated with the collage images, and an importance level map associated with areas of a collage shape; and a processor coupled to the non-transitory machine-readable storage medium, the non-transitory machine-readable storage medium storing instructions that when executed by the processor:

create a collage of the collage images in the collage shape based on the priority scores associated with the collage images and the importance level map; and determine a candidate collage score for the collage based on an informativeness parameter and a coverage parameter, wherein the imformativeness parameter is based on a least one of the priority scores associated with visible regions of the collage images and positions of the visible regions within the importance level map, and wherein the coverage parameter is based on an amount of the collage shape covered by the collage images.

8. The apparatus of claim 7, wherein the instructions that create a collage further comprise instructions that:

determine relative sizes of the collage images based on the priority scores associated with the collage images to create a set of determined sizes of the collage images; and create the collage with the set of determined sizes of the collage images.

9. The apparatus of claim 7, wherein the non-transitory machine-readable storage medium further stores instructions that:

determine regions of interest in the collage images;

determine a priority associated with each of the regions of interest based on the content of a respective region of interest and a priority of a respective collage image; and wherein the instructions that create the collage further comprises instructions that create the collage further based on the priorities associated with the regions of interests within the collage images.

10. The apparatus of claim 9, wherein two regions of interest may be determined for the respective collage image and wherein different priorities may be determined for the two regions of interest.

11. The apparatus of claim 7, wherein the instructions that create the collage of the collage images in the collage shape further include instructions that crop collage images on the edge of the collage to form the collage shape.

12. A non-transitory machine-readable storage medium comprising instructions executable by a processor that:

determine an importance level map of a collage shape;

determine regions of interest within a set of collage images and priorities associated with the regions of interest;

determine candidate collages of the set of collage images for the collage shape;

determine respective candidate collage scores associated with the candidate collages based on an informativeness parameter and a coverage parameter, wherein the informativeness parameter is based on at least one of priorities associated with visible regions of interest in a respective candidate collage and the position of the visible regions of interest within the importance level map, and wherein the coverage parameter is based on the amount of the collage shape covered by the set of collage images;

select one of the candidate collages based on the respective candidate collage scores thereby creating a selected candidate collage; and create a collage in the collage shape based on the selected candidate collage.

13. The machine-readable storage medium of claim 12, wherein the instructions that determine candidate collages further comprise instructions that determine size of each of the set of collage images within the candidate collages based on the priorities associated with the regions of interest.

14. The machine-readable storage medium of claim 12, wherein the instructions that determine the priorities associated with the regions of interest further comprise instructions that determine the priorities associated with the regions of interests based on respective priority weights of the set of collage images associated with the regions of interest.

15. The machine-readable storage medium of claim 12, wherein the instructions that determine a the importance level map of the collage shape further comprise instructions that determine the importance level map based on where areas of the collage shape further from the edge of the collage shape are given a higher priority.

* * * * *